United States Patent [19]
Lawrence

[11] 3,791,117
[45] Feb. 12, 1974

[54] ROW CROP HARVESTER ATTACHMENT

[75] Inventor: Allan Keith Lawrence, Ottumwa, Iowa

[73] Assignee: Deere & Company, Moline, Ill.

[22] Filed: July 24, 1972

[21] Appl. No.: 274,632

[52] U.S. Cl............................ 56/98, 56/13.9
[51] Int. Cl............................ A01d 45/02
[58] Field of Search. 56/94, 98, 103, 104, 105, 106, 56/107, 108, 14.1, 14.2, 13.9, 13.5

[56] References Cited
UNITED STATES PATENTS

| | | | |
|---|---|---|---|
| 3,585,789 | 6/1971 | Blanshine et al. | 56/98 |
| 3,654,752 | 4/1972 | Segredo | 56/98 |
| 3,388,538 | 6/1968 | Markham | 56/98 |
| 3,339,354 | 9/1967 | Kessler | 56/98 |
| 1,758,557 | 5/1930 | Bullock | 146/109 |
| 1,972,407 | 9/1934 | Morse | 56/364 |
| 2,507,540 | 5/1950 | Nolt | 56/364 |

FOREIGN PATENTS OR APPLICATIONS

| | | | |
|---|---|---|---|
| 1,044,516 | 10/1966 | Great Britain | 56/98 |

Primary Examiner—Russell R. Kinsey

[57] ABSTRACT

A three-row row crop harvesting attachment for a forage harvester has three generally fore-and-aft passages which receive three rows of row-planted crops as the machine advances, a cutting apparatus being provided at the forward end of each passage for severing the crop from the field. A pair of gathering devices are disposed along opposite sides of each passageway and move the stalks upwardly and rearwardly to the crop inlet on the forage harvester. Each gathering device includes an endless chain trained around front and rear sprockets and having belt-like loops which extend into the passageway and intermesh with the loops in the opposite gathering device to grasp the stalks of the crop, the rear sprockets for the center pair of gathering devices being disposed above the level of and forwardly of the other rear sprockets. A pair of rollers extend upwardly from the rearward end of the fenders overlying the outer two gathering devices and are respectively coaxially connected to the outer rear sprockets, so that the inner peripheries of the rollers engage the crop in the outer two passageways to assist in the convergence of the crop into the inlet opening. A pair of generally horizontal forwardly diverging arms extend forwardly from the upper ends of the rollers to guide the upper portions of the stalks.

3 Claims, 5 Drawing Figures

3,791,117

ROW CROP HARVESTER ATTACHMENT

BACKGROUND OF THE INVENTION

This invention relates to an attachment for a forage harvester, and more particularly to an improved row crop attachment for harvesting more than two rows at a time.

Heretofore, most forage harvesters operating in row-planted stalk crops, such as corn or the like, utilized a row crop attachment capable of harvesting only one or two rows at a time. However, with the advent of higher capacity forage harvesters, powered by higher horsepower tractors, and also with the introduction of relatively large self-propelled forage harvesters, the forage harvesters have been capable of handling more than two rows of crop at a time, and accordingly harvesting attachments capable of harvesting three rows of crop at a time are now available. However, the width of the forage harvester cutterheads and the width of the crop inlet on the basic forage harvester unit have generally remained the same, and a problem has arisen in sufficiently consolidating the crop from the three rows into a narrow enough mass to enter into the forage harvester inlet.

It is known to provide endless chain-type conveyors with belt-like loops disposed alongside the fore-and-aft passageways for each row for grasping the stalk of the crops and conveying them rearwardly, such a harvesting apparatus being disclosed in U.S. Pat. Nos. 3,339,354 issued to Kessler on 5 September 1967 and 3,388,538 issued to Markham on 18 June 1968, both of which are assigned to the assignee herein. However, the space required for the rearward ends of the conveyors requires a relatively large transverse dimension, which is greater than the crop inlet opening on a conventional harvester. It is also known to provide one or more upright rollers at the rearward end of the fenders or gathering members to assist in the feeding of crops draped over the fenders, such rollers being shown in the latter of the above patents.

SUMMARY OF THE INVENTION

According to the present invention, there is provided an improved row crop harvesting attachment for harvesting more than two rows of crops at a time. An important feature of the invention resides in the provision of generally upright rollers having their inner sides respectively immediately in front of the opposite sides of the forage harvester inlet to assist in the convergence of the crop into a narrow enough mat to fit in the inlet. Also according to the invention, the rollers are provided with flutes, and the space between the outer peripheries of the rollers is substantially the same as or slightly less than the width of the crop inlet, to provide aggressive feeding of the crop into the inlet.

Another feature of the invention resides in the fact that the rollers are respectively coaxially connected to and driven by the outer rear sprockets of the gathering conveyors to provide a simple and economic drive for the rollers, the rollers being tilted upwardly and forwardly since the gathering conveyors extend downwardly and forwardly.

Another important feature of the invention resides in the arrangement of the rearward drive sprockets for each of the gathering conveyors, with the rear sprockets for the center row being disposed above and forwardly of the rear sprockets for the outer two rows, allowing the inner sprockets for the outer rows to be spaced closely together so that the discharge ends of the outer rows are sufficiently close that the crop will fit into the forage harvester inlet, the crop in the center row feeding into the inlet above the crop from the outer two rows.

Still another feature of the invention resides in the provision of a pair of generally horizontal, forwardly diverging arms generally above the outer fenders to assist in the guidance of the upper parts of the stalks into the inlet opening.

Also according to the invention, a simple and economic drive system is provided for driving the cutting means, the gathering conveyors, and the rollers.

DESCRIPTION OF THE PREFERRED EMBODIMENT

Figure 1:
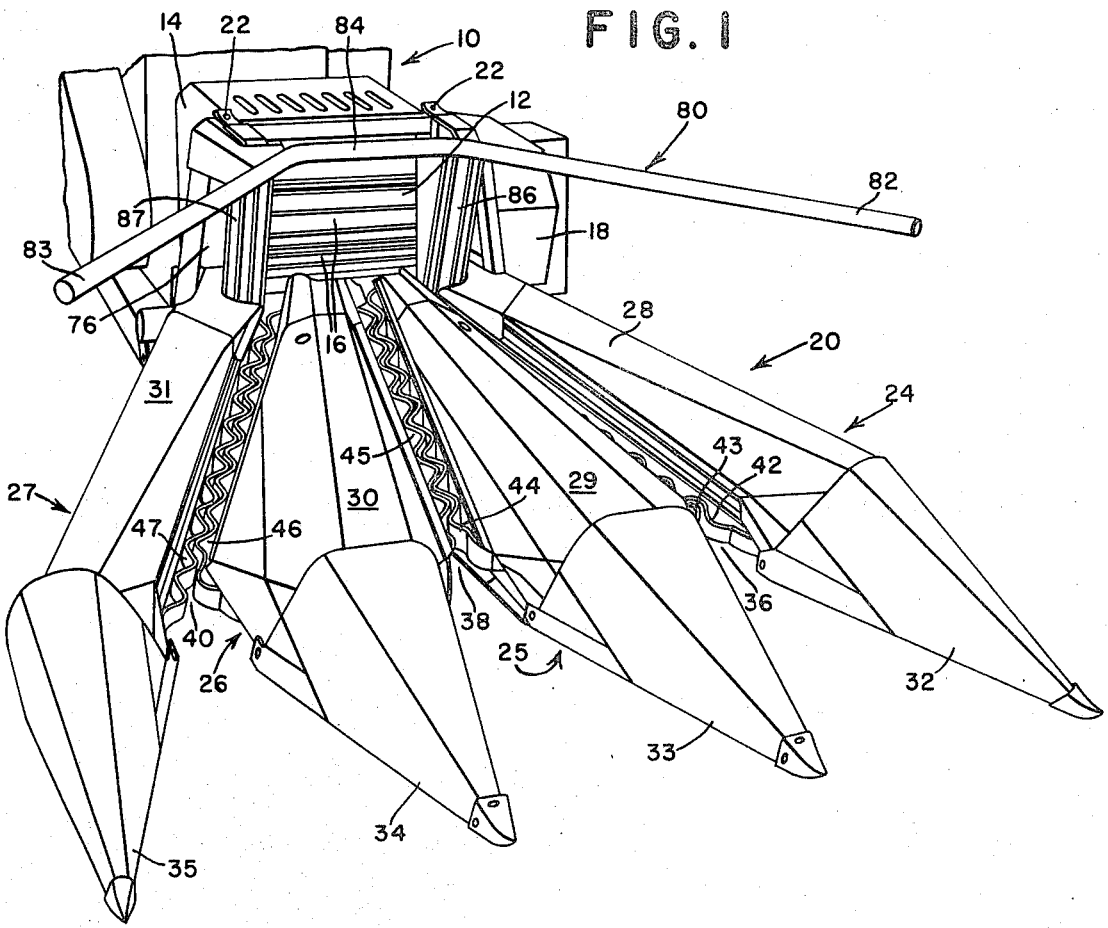
FIG. 1 is a right front perspective view of a three-row row crop attachment embodying the invention and mounted on a forage harvester, only the forward portion of which is shown.
Figure 2:
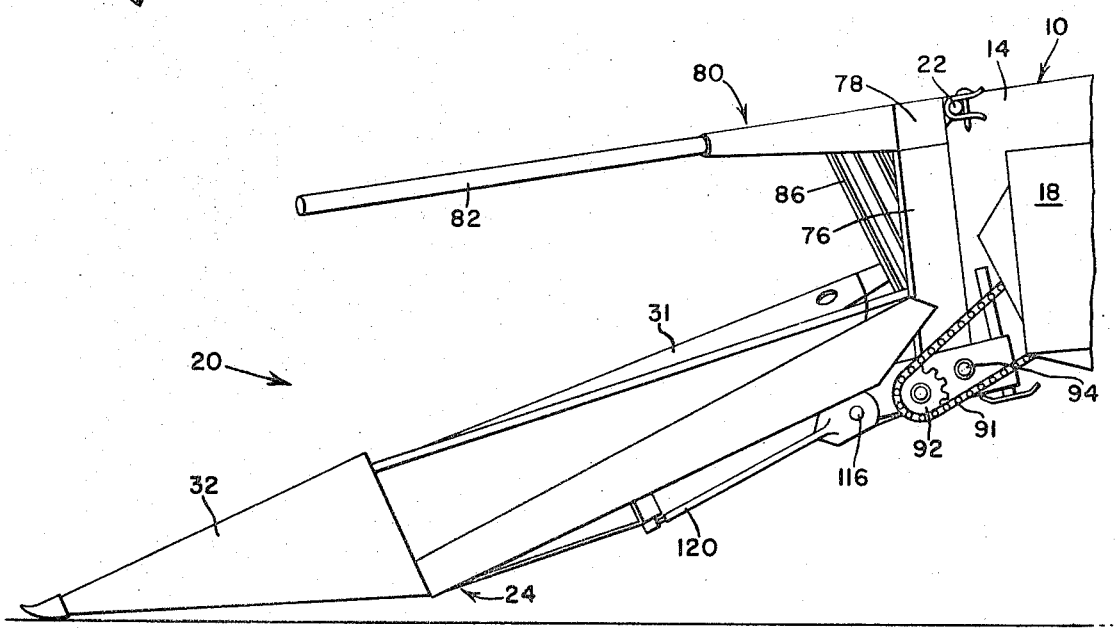
FIG. 2 is a left side elevational view of the row crop attachment.
Figure 3:
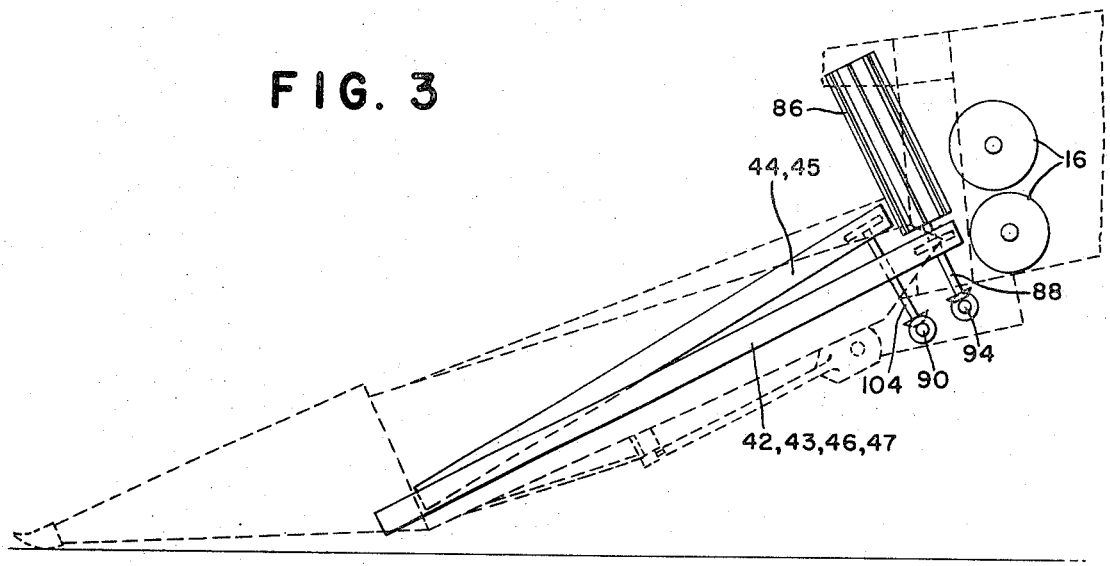
FIG. 3 is a schematic left side elevation view showing the relative locations of the components, with the outline of the attachment being shown in phantom.
Figure 4:
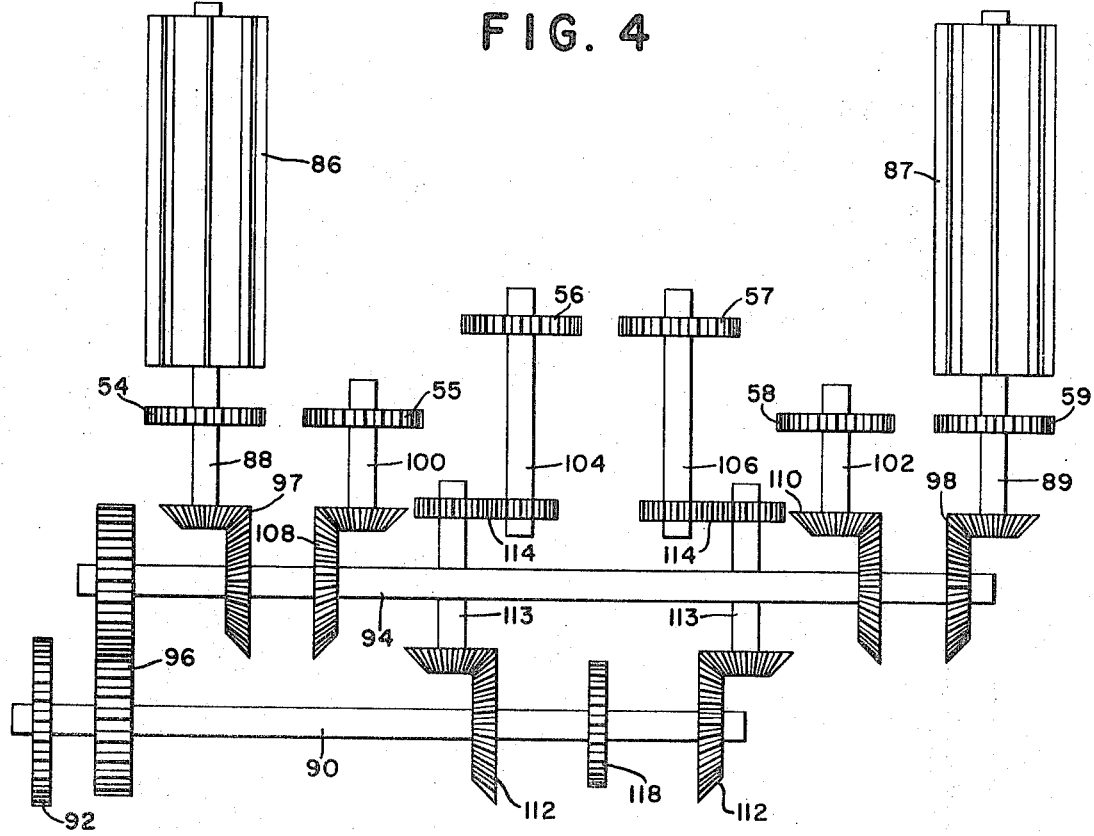
FIG. 4 is a schematic view of the drive system for the upright rollers and the gathering conveyors on the attachment.

The forward or cutterhead and feed roll assembly portion of a self-propelled forage harvester is indicated generally by the numeral 10 in FIGS. 1 and 2, the construction of the self-propelled forage harvester being shown in greater detail in U.S. Pat. No. 3,701,239. As is well known, the forage harvester has a forward, generally rectangular inlet opening 12 which spans the width between the opposite side walls 14 of the cutterhead and feed roll portion 10. A pair of transversely oriented vertically spaced feed rolls 16 are mounted in the harvester portion 10 immediately behind the inlet opening 12, the forward side of the upper roll projecting slightly through the inlet opening. As is well known, a crop entering through the inlet opening passes between the feed rolls 16 to a second pair of feed rolls, which deliver the crop over a shear bar to a cylinder-type cutterhead, which reduces the crop. The feed rolls 16 are driven in opposite directions by a drive system, which is partly shielded by drive shielding 18 on the left side of the cutterhead and feed roll assembly portion 10.

The invention is embodied in a three-row row crop harvesting attachment indicated generally by the numeral 20 and mounted on and extending forwardly from the forage harvester portion 10 in communication with the inlet opening 12. As is conventional, the attachment 20 is mounted on four attachment points 22, only the upper two points of which are illustrated.

The harvesting attachment includes four separated generally fore-and-aft downwardly and forwardly inclined gathering members respectively indicated by the numerals 24, 25, 26 and 27 from left to right on the machine. The gathering members respectively include fenders 28, 29, 30 and 31 having pointed forward portions or gathering points 32, 33, 34 and 35. As is well known, the gathering points ride along the ground between the rows of standing crop as the machine advances to separate down and tangled crops, and the fenders present smooth upper surfaces, which allow the crop to slide rearwardly along their top surface to the inlet opening 12. The space between the gathering members 24 and 25 forms a generally fore-and-aft upwardly and rearwardly inclined passageway 36, the space between the gathering members 25 and 26 forms a center passageway 38, and the space between the gathering members 26 and 27 form a third passageway 40, all of the passageways being upwardly and rearwardly inclined, while the outer two passageways 36 and 40 diverge forwardly since the spacing between the three rows which are respectively received in the passageways is substantially greater than the width of the inlet opening 12. In the illustrated embodiment, the forward ends of the passageways are spaced 30 inches apart to accommodate 30-inch rows in the crop, while the width of the inlet opening and the distance between the side walls 14 is approximately only 22 inches. As is apparent, each passageway terminates immediately in front of the inlet opening 12, so that the crop is engaged by the feed rolls 16 as it leaves the passageways.

Figure 5:
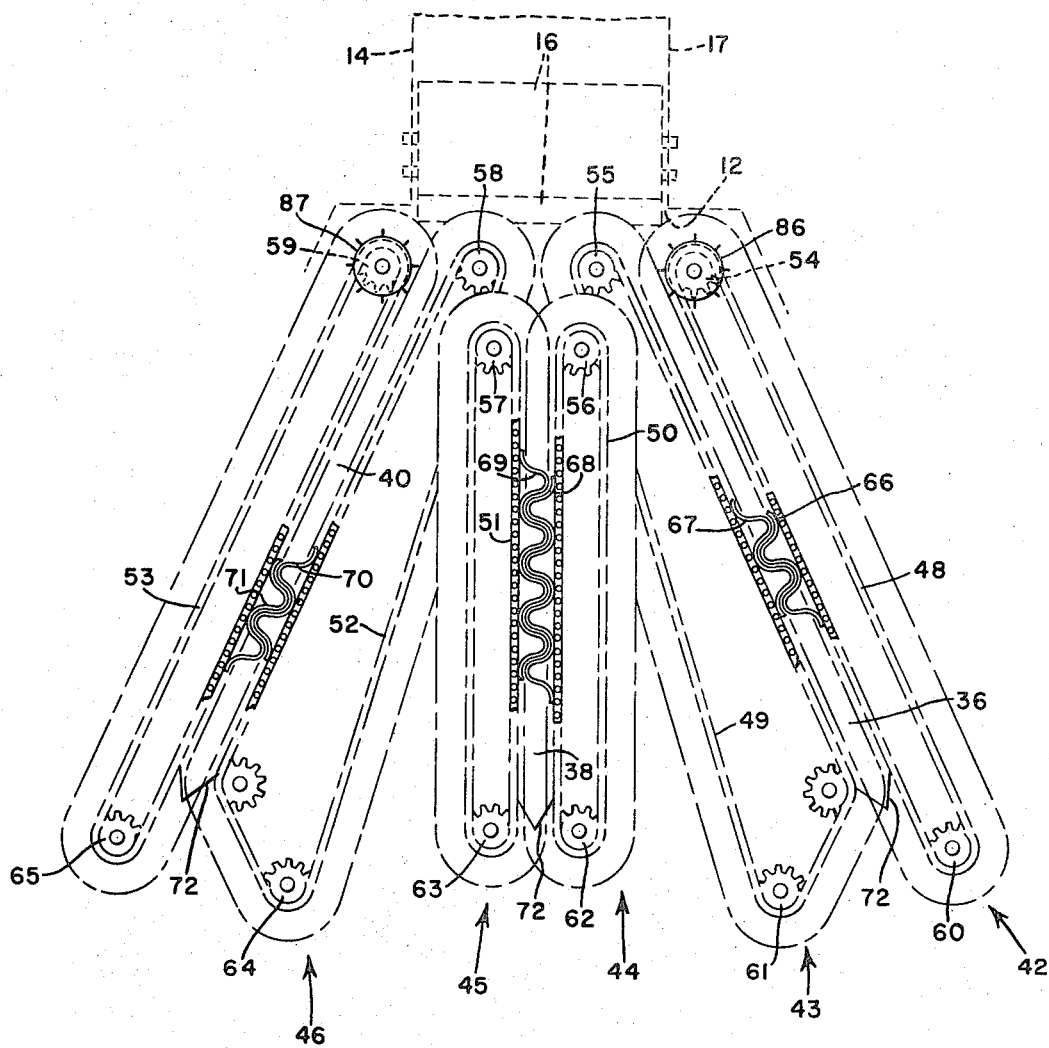
FIG. 5 is a schematic plan view of the gathering conveyors.

A pair of endless flexible gathering conveyors 42 and 43 are respectively disposed on opposite sides of the left passageway 36 and have inner runs alongside the passageway for engaging the crop therein and moving the crop to the rearward discharge end of the passageway. Similarly, a pair of endless flexible gathering conveyors 44 and 45 are disposed on opposite sides of the center passageway 38, and a third pair of gathering conveyors 46 and 47 are respectively disposed on opposite sides of the right-hand passageway 40. The construction of the conveyors 42–47 is described in greater detail in U.S. Pat. No. 3,339,354, also assigned to the assignee herein. The gathering conveyors 42–47 respectively include chains 48, 49, 50, 51, 52 and 53, which are respectively trained around rear sprockets 54, 55, 56, 57, 58 and 59 and front sprockets 60, 61, 62, 63, 64 and 65. A belt 66 is attached to the chain 48 at intervals and forms generally outwardly extending sinusoidal loops, which extend into the passageway 36 and intermesh with the loops in a similar belt 67 attached to the chain 49. Similarly, belts 68, 69, 70 and 71 are respectively attached to the chains 50, 51, 52 and 53 to form intermeshing loops in the passageways 38 and 40. Thus, as the machine advances, the stalks of row crops entering the respective passageways are clamped between the intermeshing flexible belt loops on the respective conveyors and are then severed from the field by a reciprocating-type cutting apparatus 72 disposed below the gathering conveyors adjacent the forward end of each passageway, the cutting apparatus being of known construction as schematically illustrated in FIG. 5. After the crop is severed from the field, the stalks are moved upwardly and rearwardly along the passageway by their respective cooperating conveyors.

A pair of upright members 76 extend upwardly from the rearward end of the outer two gathering members at the rearward end of the attachment and are connected by a transverse member 78 above the inlet opening 12. An upper stalk control indicated generally by the numeral 80 extends forwardly from the transverse member 78 and includes a pair of forwardly diverging arms 82 and 83 having their rearward ends connected by a central transverse portion 84. As is apparent, the arms and the central portion are made of a tubular member and the arms 82 and 83 are respectively disposed above the outer two gathering members 24 and 27. The arms 82 and 83 engage the upper portions of upright stalk crops and converge the crops inwardly as the butt portions are converged upwardly and rearwardly along the outer two passageways. When the upper portions of the crop reach the transverse central portion 84, their rearward movement is blocked, while the gathering conveyors continue to move the butt portions, whereby the crop is fed butt first through the inlet opening.

A pair of generally upright fluted rollers 86 and 87 are disposed forwardly of the upright members 76 and extend upwardly from the rearward end of the fenders 28 and 31, the upper ends of the rollers being supported in the upper stalk control 80. The inner sides of the rollers 86 and 87 respectively extend somewhat into the left and right passageways 36 and 40 at the rearward end of the passageways adjacent the rearward end of the conveyors 42 and 47. In the illustrated embodiment, the distance between the peripheries of the rollers immediately above the passageway is approximately 21-½ inches, which is approximately the same as the width of the inlet opening, so that the inner sides of the rollers are disposed immediately in front of the opposite sides of the inlet opening. The rollers 86 and 87 respectively include axial shafts 88 and 89, which extend downwardly from the roller and are respectively coaxially connected to the rear sprockets 54 and 59 of the conveyors 42 and 47, so that the rollers are driven in the same direction as the chains 48 and 53, which means, of course, that the inner sides of the rollers move rearwardly. As is apparent, the crop is engaged by the inner sides of the rollers as it leaves the outer two passageways, so that the rollers assist in the convergence and the feeding of the crop into the inlet opening 12. As is also apparent, the rollers are inclined somewhat upwardly and forwardly, since the sprockets 54 and 59 are inclined as a result of the inclination of the conveyors 42 and 47.

The drive system for the attachment includes a transverse input shaft 90, which spans the width of the attachment adjacent a lower rearward end of the attachment. The input shaft 90 is driven by a chain drive 91, which includes a sprocket 92 on the left end of the input shaft, the chain drive being connected to a drive sprocket on the harvester, which is covered by the drive shielding 18. The input shaft drives a transverse countershaft 94 through a spur gear set 96, the shaft 94 being disposed immediately behind and parallel to the input shaft. A bevel gear set 97 connects the countershaft 94 to the shaft 88 for the rear drive sprocket 54 and the roller 86, and a similar bevel gear set 98 connects the shaft 94 to the shaft 89 of the roller 87 and the rear drive sprocket 59. The rear drive sprockets 55 and 58 for the inner conveyors 43 and 46 for the outer passageways have drive shafts 100 and 102, which are respectively connected to the countershaft 94 by bevel gear sets 108 and 110. The rear sprockets 56 and 57 respectively have shafts 104 and 106, each of which is driven by the input shaft 90 by means of a drive including a bevel gear set 112 connecting a countershaft 113 to the shaft 90 and a spur gear set 114, which connects the countershaft to the sprocket shaft. The countershafts 113 are offset from the shafts 104 and 106 to clear the gathering conveyors 43 and 46. The input shaft is connected to a third transverse shaft 116 forwardly of the input shaft by a chain drive, only the sprocket 118 of which is illustrated in the drawings. The drive shaft 116 is respectively connected to the three cutting apparatus 72 by means of cutter drives 120 of known construction.

In operation, as previously described, the stalks of standing row crops are clamped at the forward end of the respective passageways by the respective gathering conveyors and are severed from the field by the respective cutting apparatus 72 as the machine advances. The stalks are then conveyed upwardly and rearwardly along the respective passageway, the stalks in the outer two passageways being converged by the converging passageways. The center gathering conveyors 44 and 45 are inclined at a somewhat greater angle than the outer gathering conveyors, the sprockets 56 and 57 for the center two conveyors being disposed substantially above the level of the other rear sprockets, so that the rearward ends of the center belts 68 and 69 are generally above the belts 66, 67, 70, and 71, whereby the crop in the center row is released at a higher level and delivered at a higher elevation through the inlet opening. As is also apparent, the rear sprockets 56 and 57 are disposed forwardly of the other rear sprockets so that the center two conveyors 44 and 45 terminate forwardly of the other conveyors. The above arrangement permits the rearward ends of the conveyors 43 and 46 to be disposed adjacent to one another allowing the discharge point for the outer two passageways to be spaced sufficiently close together that the crop will fit into the relatively narrow inlet opening 12. As previously described, the rollers 86 and 87 assist in the convergence and feeding of the crop into the inlet opening.

I claim:

1. In a harvesting machine having a mobile body adapted to advance over a field of row-planted crops and provided with a forward crop inlet with generally upright opposite sides, the combination therewith of an improved multi-row crop harvesting attachment comprising: at least four generally fore-and-aft, downwardly and forwardly inclined gathering members, each gathering member including a fender presenting a smooth upper surface on top of the gathering member and a forward gathering point adapted to ride along the ground between the crop rows; at least three generally fore-and-aft, upwardly and rearwardly inclined passageways respectively formed between adjacent gathering members and adapted to receive the crop growing in a row as the machine advances; means adjacent the forward end of each passageway for severing the crop from the field; a pair of gathering conveyors respectively disposed on opposite sides of each passageway for engaging the crop therein and moving the severed crop to the crop inlet, each gathering conveyor including a front sprocket mounted on the gathering member adjacent the passageway, a rear sprocket mounted on said gathering member adjacent to and forwardly of the crop inlet, and an endless, flexible element trained around the front and rear sprockets; a pair of approximately upright rollers disposed above the rear sprockets of the outer two gathering conveyors and extending upwardly from the rearward ends of the fenders on the outer two gathering members, the inner sides of the rollers extending into the outer two passageways and being disposed generally in fore-and-aft alignment with the opposite sides of the inlet; and drive means for rotating the rear sprockets and the rollers so that the inner sides of the rollers move rearwardly and converge the crop into the crop inlet and the inner runs of the gathering conveyor move rearwardly along opposite sides of the respective passageways, the drive means including a pair of generally vertical shafts respectively coaxially connected to the outer rear sprockets and to the respective rollers.

2. The invention defined in claim 1 including a pair of upright members extending upwardly from the rearward ends of the outer two gathering members, and an upper stalk control extending forwardly from the upright members and including a pair of forwardly diverging arms, the rollers being disposed immediately in front of the upright members with the upper ends of the rollers being supported in the upper stalk control.

3. The invention defined in claim 2 wherein the drive means includes a first transverse input shaft, a second transverse shaft parallel to and driven by the input shaft, bevel gear means respectively connecting the second transverse shaft to the opposite generally upright drive shafts, means including bevel gear means connecting the input shaft to the rear sprockets of the central gathering conveyors, and means including bevel gear means connecting the second transverse shaft to the rear sprockets of the inner gathering conveyors along the outer two passageways.

* * * * *